US008251379B2

(12) United States Patent
Watzke

(10) Patent No.: US 8,251,379 B2
(45) Date of Patent: Aug. 28, 2012

(54) APPARATUS FOR TRANSPORT OF OBJECTS

(76) Inventor: David J. Watzke, Placentia, CA (US)

( * ) Notice: Subject to any disclaimer, the term of this patent is extended or adjusted under 35 U.S.C. 154(b) by 559 days.

(21) Appl. No.: 11/881,170

(22) Filed: Jul. 25, 2007

(65) Prior Publication Data

US 2009/0026735 A1 Jan. 29, 2009

(51) Int. Cl.
*B62B 3/02* (2006.01)
(52) U.S. Cl. ............... 280/35; 280/651; 280/79.3
(58) Field of Classification Search .............. 280/638, 280/35, 651, 652, 659, 47.24, 63, 79.11, 280/79.3
See application file for complete search history.

(56) References Cited

U.S. PATENT DOCUMENTS

| | | | | |
|---|---|---|---|---|
| 2,419,422 A * | 4/1947 | Schulein | ................. | 280/651 |
| 3,136,429 A * | 6/1964 | Kleinschmidt | ............ | 414/809 |
| 3,871,676 A * | 3/1975 | Renard et al. | ............ | 280/35 |
| 3,955,826 A * | 5/1976 | Riedesel | ................ | 280/35 |
| 4,166,638 A | 9/1979 | De Prado | ................ | 280/638 |
| 4,895,381 A * | 1/1990 | Farlow | ................ | 280/33.997 |
| 5,016,893 A * | 5/1991 | Hart, Jr. | ................ | 280/35 |
| 5,249,823 A * | 10/1993 | McCoy et al. | ............ | 280/656 |
| 5,280,944 A * | 1/1994 | Bearden | ................ | 280/656 |
| 5,660,637 A * | 8/1997 | Dodge | ................ | 118/500 |
| 5,863,056 A | 1/1999 | Hostetter | ................ | 270/47.371 |
| 6,085,370 A | 7/2000 | Lobascio | ................ | 5/510 |
| 6,109,644 A * | 8/2000 | Cox | ................ | 280/652 |
| 6,979,035 B2 | 12/2005 | Freeland | ................ | 294/152 |
| 7,066,475 B2 * | 6/2006 | Barnes | ................ | 280/35 |
| 7,448,632 B1 * | 11/2008 | Nieto | ................ | 280/47.24 |

* cited by examiner

*Primary Examiner* — Frank Vanaman
(74) *Attorney, Agent, or Firm* — Stout, Uxa, Buyan & Mullins; Carlos A. Fisher

(57) ABSTRACT

A apparatus and method for transporting oversized objects, particularly substantially flat or planar objects. In certain embodiments the object is a material in sheet form, such as a wood sheet, metal sheet, dry wall, and the like, or a narrow object such as bed mattresses, tabletops, mirrors and plate glass, doors and the like. Preferably the object is capable of being transported by a single person. In certain embodiments the apparatus is structured to be capable of transporting a mattress through an open doorway without unloading the object.

12 Claims, 5 Drawing Sheets

APPARATUS FOR TRANSPORT OF OBJECTS

FIELD OF THE INVENTION

The present invention concerns the transport of objects, particularly, though not exclusively, objects that are large or unwieldy for a single person to carry unaided. Thus, the present invention includes a transport mechanism for transporting such large and unwieldy objects. The transport mechanism or apparatus may enable many objects that formerly required the participation of more than one person to be carried or transported to be moved by a single user. In addition, the present invention includes methods for making the transport apparatus as well as methods for transporting objects, particularly large or unwieldy objects.

BACKGROUND OF THE INVENTION

Mechanical aids for the transport of objects are among the oldest examples of human innovation. The Pyramids of Giza, Stonehenge, and the statues of Easter Island are just a few of the ancient human-built structures built using such aids including wedges, a track of logs and perhaps pulley-type devices to transport large stones from the quarry to the building site, often over many miles. The earliest example of the wheel, discovered in Mesopotamia, dates to about 3500 B.C.

Even more sophisticated devices for the transport of objects and people have revolutionized and changed the world and altered its landscape. Boats, wagons, sledges, trains, automobiles and airplanes all have the fundamental object to carry objects (or people) over long distances. Mechanical aids such as wheelbarrows, carts, forklifts and the like are designed for carrying objects or material over shorter distances.

One device having a diverse utility for the relatively short distance transport of objects ranging from boxes and crates to furniture is the "hand truck". This device generally consists of a wheeled apparatus having an L-shaped side profile, with wheels located at the vertex of the angle forming the "L" shape, such angle being approximately 90 degrees. The horizontal portion of the L is generally considerably shorter than the vertical portion. Both horizontal and vertical portions of the hand truck are made from one or more rigid material such as a metal or metal alloy (e.g., steel, bronze, iron, aluminum and the like), but may comprise a sufficiently hard wood, plastic, composite (such as a carbon composite) or other material. When the vertical portion of the L-shaped hand truck profile is viewed from the rear it generally comprises two upwardly extending lateral arm members, with each lateral arm member terminating in a handle. The upwardly extending lateral arms are rigidly connected by, for example, at least two reinforcing horizontal members which provide mechanical strength and resistance to twisting and separating forces placed on the lateral arm members during use.

The horizontal portion of the L is generally a substantially flat plate of material and, in side profile extends outward from the vertex of the angle forming the L shape. The width of the horizontal portion is generally approximately the distance between the arm members of the vertical portion of the L, and also is made from a sufficiently hard and rigid material to be subject to forces in for example, the hundreds of pounds. A particular feature of this kind of hand truck is that the L shape and strong construction of the device result in the hand truck constituting a lever, with the vertical portion of the L being a relatively long lever arm. When the flat horizontal member of the hand truck is slid under an object to be transported and the vertical member is then brought towards a horizontal position using the vertex of the L as a fulcrum, the object is lifted from the ground and is supported by both the vertical and horizontal portions of the hand truck. Furthermore, since the wheels of the hand truck are situated at, and extend slightly below the vertex of the L, when the object is lifted, most of the weight of the object rests on the wheels, with only a portion of this weight being supported by the person or persons holding the handles of the vertical portion of the hand truck. The object can thus easily be wheeled to a location, the vertical portion again allowed to assume a vertical position, and the horizontal portion of the hand truck slid from under the object to complete the transport.

As can be seen, the hand truck is a very versatile device that permits the transport of multiple and/or moderately heavy objects that could otherwise not be moved by a single person. For this reason, hand trucks are ubiquitously used in warehouses, by furniture movers and the like. However, this device does have limitations.

For example, the short horizontal portion of the hand truck typically only supports a portion of the object to be transported. This requires the object to be transported to have sufficient internal rigidity or cohesiveness to be able to support a portion, often a large portion, of its own weight itself. If the object is large or its weight is not adequately balanced (for example, an appliance such as a refrigerator, stove or similar object), it must be fastened to the vertical portion of the dolly, such as by using straps. However, straps generally only hold the object solidly against the vertical portion; they typically do not provide substantial lateral support unless the object is wide and rigid enough to fit and be supported by the fastener straps. Of course, if the object is too large, the straps may not be sufficiently long to retain or support the object.

Additionally if the object to be transported is, for example, narrow and/or long or wide in shape (i.e., extending outward along the plane of the horizontal portion of the L-shape of the hand truck in side profile), a hand truck is also imperfectly effective. The hand truck lacks sufficient lateral support to prevent the narrow object from sliding off the hand truck or flopping from side to side during transport. Additionally, proper and secure alignment of an object on a hand truck during transport is far more difficult when the object is long and/or narrow as compared to an object that is, for example, wide and short.

Also, even if the weight of the object is evenly distributed, if it is sufficiently long, the majority of the mass of the object extends beyond the supporting plate of the horizontal portion of the hand truck. If the object is rigid and long enough, the lever arm of the horizontal portion of the hand truck is thereby lengthened, causing it to exert a greater force on the vertical portion of the hand truck, resulting in a resistance to the downward force placed on the vertical portion when it tipped downward into a "transport" position. In extreme cases the hand truck is ineffective because the lever advantage of the system is reversed when the length of the lever arm of the load exceeds that of the vertical portion.

Oddly sized objects that lack sufficient rigidity (such as a mattress) are also difficult to transport using a hand truck. As stated above, a hand truck provides virtually no side (lateral) support and relies on straps to provide resistance to a shift in the lateral position of the object. However, if the object cannot be strapped tightly without bending, folding or deforming the object, the straps or other retaining means may not be able to provide sufficient resistance against such a shift.

In particular, objects such as materials in sheet form, for example wood sheets, metal sheets, dry wall, and the like cannot easily be transported using a hand truck. Similarly, objects including bed mattresses, tabletops, mirrors and plate glass are not generally amenable to easy transport using a hand truck, particularly if parts of the transport route are narrow (such as doorways and halls) and cannot accommodate such objects being loaded "sideways" on the hand truck.

Several attempts have been made to devise alternative transport apparatus suitable for the transport of objects that are not easily moved using the traditional hand truck. Thus, U.S. Pat. No. 4,166,638 discloses a platform having 4 caster wheels and fitted with straps for moving items of furniture. This platform is not disclosed as having any lateral or vertical support.

U.S. Pat. No. 5,863,056 discloses a mattress moving system, said to be performable by one person, consisting of a single horizontal strap with detachable handles to which are fastened a pair of vertical straps, each one having an expandable, detachable and adjustable castered platform having wheels for rolling the mattress in an upright position, standing on edge. The mattress must first be affixed with the straps (which requires affixing the vertical straps to the horizontal strap), the horizontal strap placed on the mattress while it is lying on one side, then stood on one edge and the vertical straps affixed by raising first one then the other end of the mattress. This system appears to require substantial work to prepare the mattress for transport and does not readily address the problem, seen with many mattresses, that the mattress droops or sags when stood on an edge without adequate lateral support.

U.S. Pat. No. 6,085,370 describes a device for carrying a mattress comprising a mattress cover affixed to the surface of the mattress using a bungee-type cord and handles integrated into the cover. The handles are used to facilitate moving the mattress, which it appears would be most easily transported by more than one person.

U.S. Pat. No. 6,979,035 is drawn to an apparatus to assist in the manual transport of large, heavy, or unwieldy objects comprising a strap with two cradle assemblies which fit under and support the mattress and a handle at each end of the strap to facilitate carrying the mattress. However, at least two persons (one on each side of the mattress) are required to use this device, and the full weight of the load is borne by the movers.

Thus, there exists a continuing need for apparatus and methods for the transport of objects, particularly although not necessarily exclusively, objects such as materials in sheet form, for example wood sheets, metal sheets, dry wall, and the like, as well as narrow objects such as bed mattresses, tabletops, mirrors and plate glass and the like.

SUMMARY OF THE INVENTION

The present invention is related to the transport of objects. Thus, the invention includes apparatus for the transport of objects, particularly, although not necessarily exclusively, substantially flat or planar, narrow and/or long objects. Examples of materials that may easily be transported using the present apparatus include, without limitation, objects such as materials in sheet form, for example wood sheets, metal sheets, dry wall, and the like as well as narrow objects such as bed mattresses, tabletops, mirrors and plate glass, doors and the like.

In accordance with the invention, the apparatus may comprise a wheeled "dolly" comprising a wheeled rear component comprising at least a pair of vertically extending rigid members able to laterally support an object placed therebetween, an optionally wheeled front component comprising at least one handle and at least a pair of lateral supports to restrain lateral movement of an object placed therebetween, and a horizontal support component joining the rear component and the front component.

Further in accordance with the invention, the apparatus may comprise a wheeled dolly comprising a wheeled rear component comprising at least a pair of vertically extending rigid members able to laterally support an object placed therebetween, a front component optionally comprising at least one handle, and at least a pair of lateral supports to restrain lateral movement of an object placed therebetween, and a horizontal support component joining the rear component and the front component, wherein the apparatus is adjustable in at least one parameter selected from the group consisting of a) the length of the horizontal support component, b) the width between the vertically extending rigid members, c) the width between the lateral supports and d) the height of the vertically extending rigid members in order to accommodate and support objects of differing width or length.

Further in accordance with the invention, the apparatus may comprise a wheeled dolly comprising a wheeled rear component comprising at least a pair of vertically extending rigid members able to laterally support an object placed therebetween, a front component comprising at least one handle and at least a pair of lateral supports to restrain lateral movement of an object placed therebetween, and a horizontal support component joining the rear component and the front component, wherein the horizontal support component has an adjustable length to permit the dolly of the invention to accommodate objects of varying length.

Further in accordance with the present invention, the wheeled dolly may comprise a wheeled rear component comprising a flattened shelf member for supporting the object to be transported, and at least a pair of vertically extending rigid members able to laterally support an object placed therebetween, a front component comprising at least one handle and at least a pair of lateral supports to restrain lateral movement of an object placed therebetween, and a horizontal support component joining the rear component and the front component, wherein the front component comprises at least one vertically extending rigid member to which the lateral supports are joined, and said vertically extending rigid member is joined at a bottom end to the horizontal support component.

Further in accordance with the invention, the apparatus may comprise two or more hoops, hooks or other fastening means for attachment of straps, bungee cords, rope, twine or other line to secure the object to the apparatus. In a preferred embodiment, the fastening means comprises integral hoops placed on each of the lateral supports and vertically extending rigid members.

In an optional embodiment, the front component and/or horizontal member may be joined to one or more wheels for example, a caster wheel, thus facilitating the transport of the object once the object is loaded onto the apparatus.

In another embodiment the front component and horizontal member of the apparatus may be joined together as part of a single frame.

In another embodiment the rear component and horizontal member of the apparatus may be joined together as part of a single, optionally adjustable frame.

In another embodiment, the rear component, front component and horizontal member are joined together as a single, optionally adjustable frame.

In another embodiment the apparatus optionally comprises a flattened horizontal shelf proximal to or joined to the front component of the apparatus approximately in the same plane and orientation as the shelf joined to the rear component of the apparatus, for further support of the object to be transported.

When an object, particularly a flat object such as a mattress or sheet material, is loaded on the present apparatus, the majority of the load may be borne by the rear component of the apparatus during transport. In this case the object will be laterally supported by the at least one pair of vertically extending rigid members joined to the rear component of the apparatus and the at least one pair of lateral supports joined to the front component of the apparatus, thus permitting the object or objects to be transported to rest on its side or edge without falling over. The weight of the object to be transported will rest on the rear component, the horizontal member and the front component.

In most cases a single person may use the present apparatus. In one embodiment, when the object is to be transported, a handle (or handles) joined to the front component of the apparatus is grasped and lifted slightly. Using the wheels joined to the rear component, the apparatus can then be pushed or pulled to transport the object to the desired location. Alternatively, the front portion may have one or more wheels and after the object has been loaded onto the apparatus, the apparatus can be wheeled to the desired location. The apparatus may be manufactured or adjusted to be narrow enough to, for example, enable the object to the transported through hallways and doors without the need to unload the object from the apparatus. Thus, in certain embodiments the total unadjusted width of the apparatus can be made to be less than about 3 feet, or less than about 2.5 feet or less than about 2 feet.

Also in accordance with the present invention is a method of transporting an object comprising the step of placing said object upon an apparatus comprising a wheeled rear component having at least a pair of vertically extending rigid members able to laterally support an object placed therebetween, an optionally wheeled front component comprising at least a pair of lateral supports to restrain lateral movement of an object placed therebetween, and a horizontal support component joining the rear component and the front component, and pushing or pulling said apparatus containing said object to the desired location.

Also in accordance with the present invention is a method of transporting an object comprising placing said object upon an apparatus comprising a wheeled rear component comprising at least a pair of vertically extending rigid members, an optionally wheeled front component comprising at least a pair of lateral supports, and a horizontal support component joining the rear component and the front component, and pushing or pulling said apparatus containing said object, wherein the object is placed between the vertically extending rigid members and said lateral supports prior to transport.

Also in accordance with the present invention is a method of transporting an object comprising placing said object upon an apparatus comprising a wheeled rear component comprising at least a pair of vertically extending rigid members, an optionally wheeled front component comprising at least one handle and at least a pair of lateral supports, and a horizontal support component joining the rear component and the front component, and pushing or pulling said apparatus containing said object, wherein the object is securely fastened to said apparatus prior to transport.

DETAILED DESCRIPTION OF THE INVENTION

The present invention concerning an apparatus for transporting an object, particularly an object having a flat or planar shape. The apparatus comprises a "dolly" having wheels and rear members and front supports for laterally stabilizing an object placed between said supports. Preferably, the object is placed on the apparatus on its narrow side, rear or front edge, whereby the object is prevented from falling on its top or bottom surface by the rear members and/or front supports.

The apparatus is particularly useful for transporting objects including mattresses, plate glass, dry wall, wooden sheets such as plywood, mirrors, table tops, doors and the like.

In a preferred embodiment, the width and/or height of one or more members or supports may be adjusted to fit and retain the object to be transported. In another preferred embodiment, the length of the horizontal support component may be adjusted in accordance with the length of the object to be transported. Also, while the front component of the apparatus need not comprise one or more wheel, in certain embodiments the front component may have one or more wheel to facilitate the transport of the object.

While the present invention is now illustrated with reference to particular embodiments, the invention claimed in this patent application is not to be construed as being limited to such embodiments and is defined solely by the claims that conclude this specification.

Figure 1:
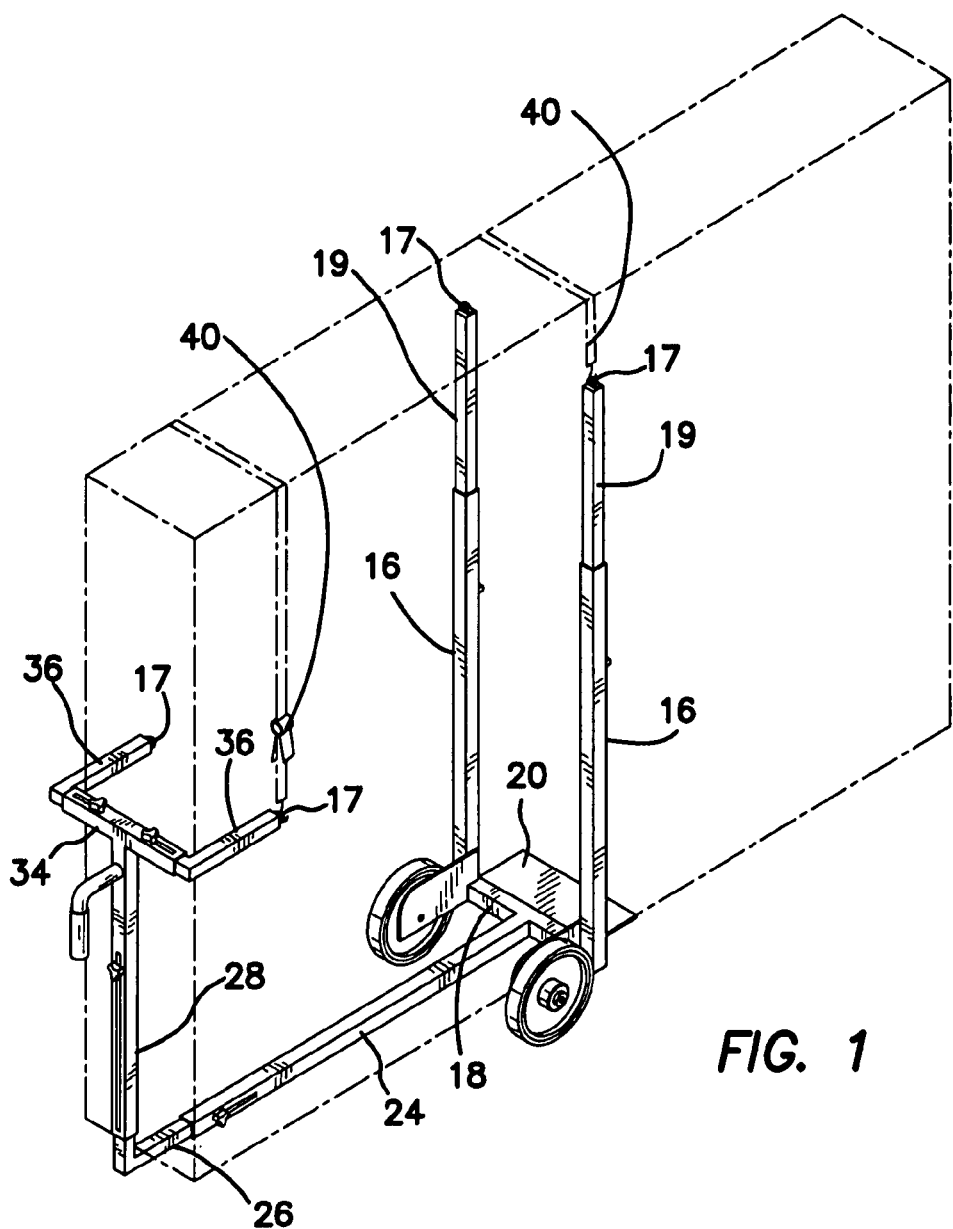
FIG. 1 is a front oblique view of one embodiment of the apparatus of the invention with an object to be transported shown in outline.
Figure 1A:
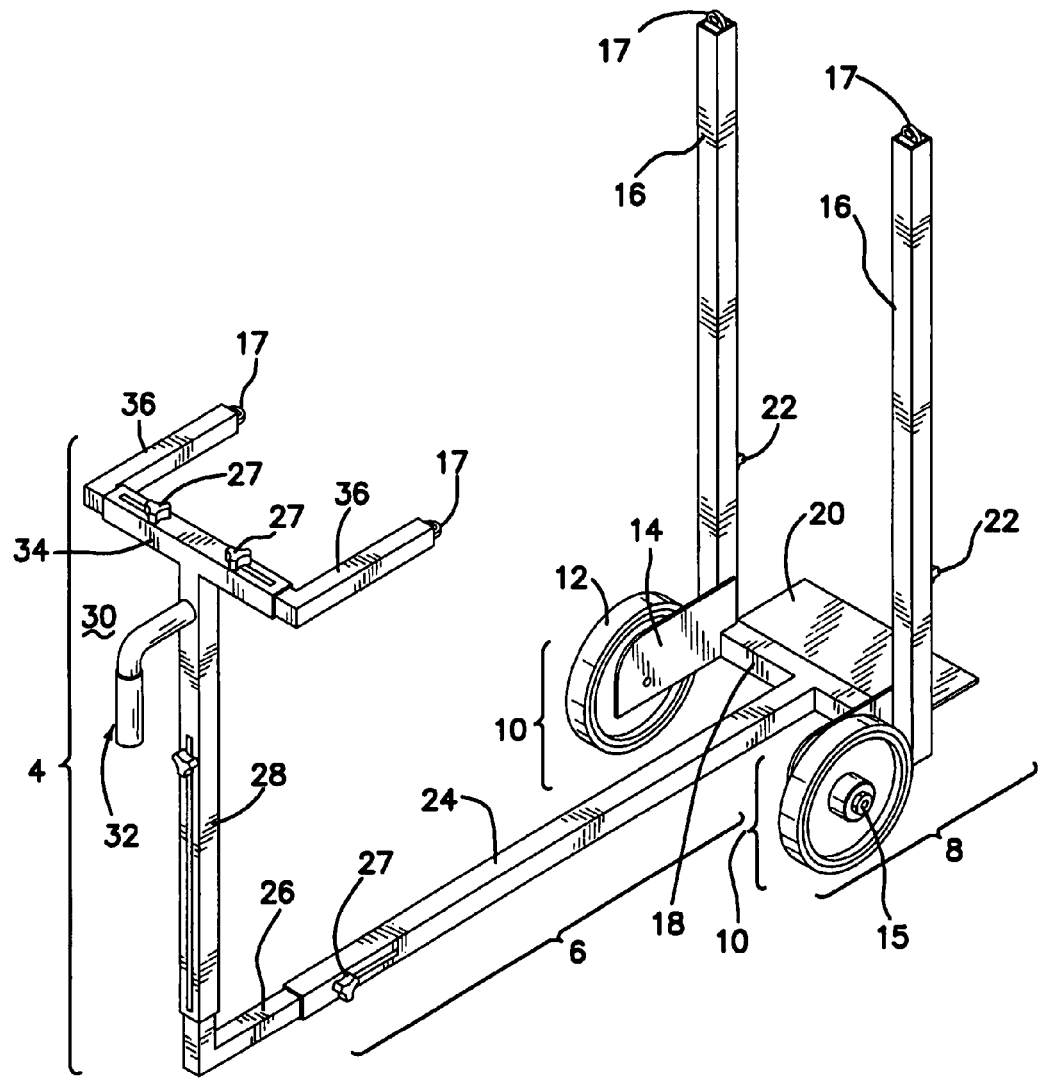
FIG. 1A is a view similar to FIG. 1 but lacking the object to be transported to permit a closer view.

With reference to FIG. 1 and FIG. 1A, one embodiment of the present apparatus is shown in front perspective, with an object loaded thereupon shown in outline. The apparatus of this embodiment comprises a frame including a rear component 8, a horizontal support component 6, and a front component 4 (shown in greater detail in FIG. 1A). With reference now to FIG. 1A, the rear component comprises two wheel assemblies 10, each comprising a wheel guard 14 which is flat on an inside surface to protect the object to be transported from the wheel and to prevent interference with the smooth transport of the object due to friction between the wheels and the object. Each wheel guard comprises a fitting on the outside vertical surface, such as an axle rod or pin 15 which connects the wheel securely and rotatably to the wheel guard. Each wheel assembly is a mirror image of the other and is securely joined (such as by bolting or welding) to a vertically extending rigid member 16. Returning to FIG. 1, the vertically extending rigid member is now shown in an extended position, and is seen to comprise a female outer member 16 and an extendable male inner member 19 slidably contained within the female outer member, each of which is itself securely joined to a rigid cross brace 18 connecting the two halves of the rear component. At the top end of each of the two vertically extending members is a welded loop 17 for fastening retaining means, for example, straps, rope, twine and/or bungee-type cord 21.

Figure 2:
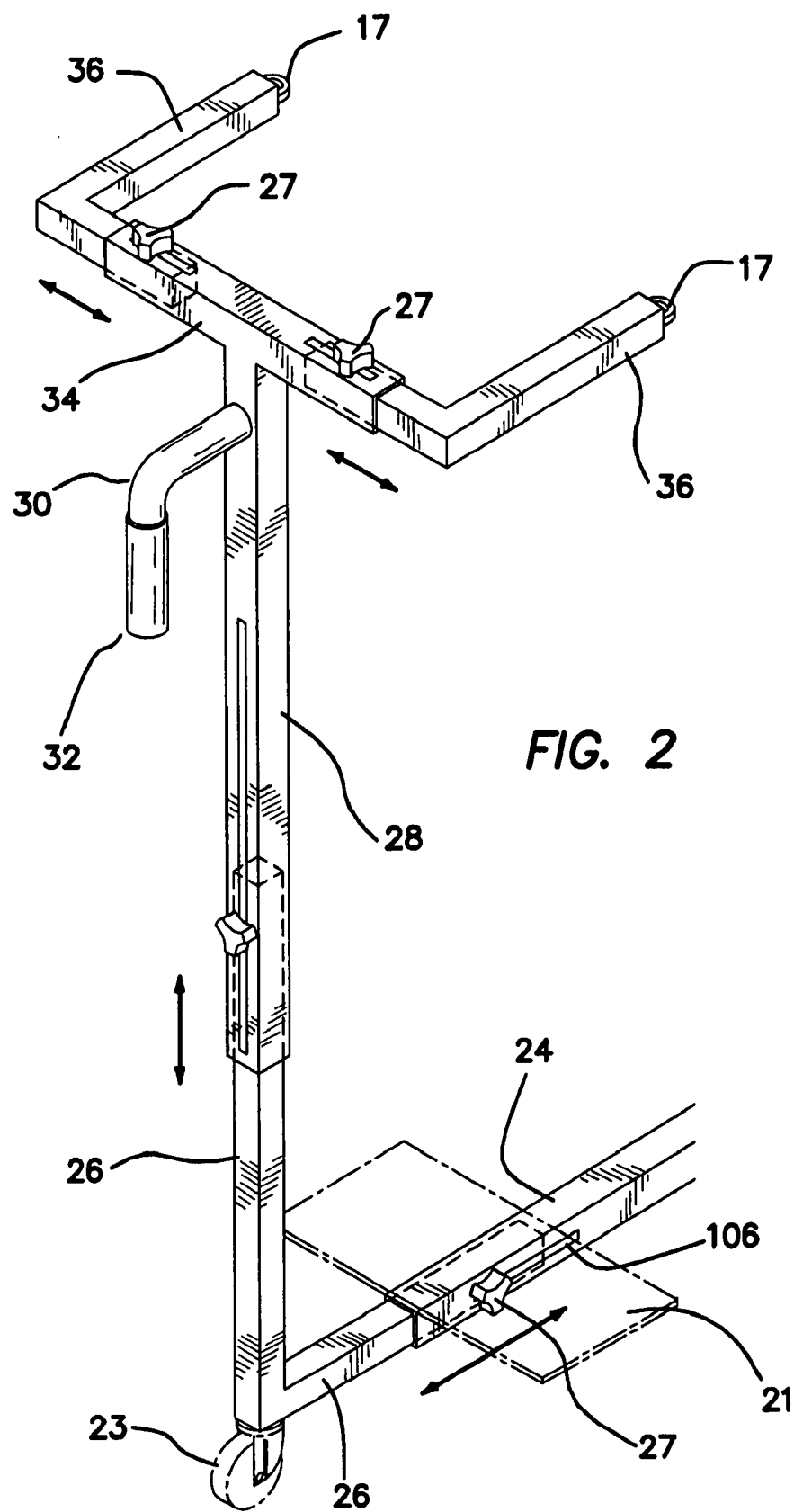
FIG. 2 is a close-up view of the front portion of an embodiment of the apparatus of the invention.

With reference to FIG. 1A, the cross brace 18, horizontal support 6, and vertically extending rigid members (including female outer member 16 and extendable male inner member contained therewithin) are made from a hard, rigid and durable material such as iron, steel, or aluminum, but may be made from any suitable material such as another metal alloy or polymeric material. In the preferred embodiments shown each of these members are slidably adjustable as can be seen clearly in FIGS. 2, 3 and 4 in which the directions of adjustment are shown with double headed arrows. In this embodiment each of the cross braces, horizontal support components and vertically extending rigid members of FIGS. 1 and 1A are comprised of two structures: these structures are exemplified in FIG. 2 for the horizontal support, which figures shows a hollow female member 24 having a bore structured to slidably fit within it a male member 26. FIG. 2. also shows a preferred means for adjusting and locking the slidable members together. The female member has a narrow elongated hole or slot 106 extending along the axis of the member's longest dimension, having a width sized to accommodate a threaded bolt. A threaded nut is firmly secured to and is oriented outwardly from the male member ensheathed within the female member, and is aligned with the slot. The threaded nut accommodates a threaded bolt having a retaining handle at a distal end 27 to facilitate screwing a bolt through the slot and into the fixed nut, and, upon tightening the bolt, preventing the male and female members from sliding relatively to each other. The bolt can be loosened to permit the male member to slide within the bore of the female member while, for example, the bolt slides along the longest dimension of the narrow hole or slot. When the overall length or width of the brace, support or other member is thereby adjusted as desired, the handle at the end of the bolt 27 is again tightened by hand to prevent further relative movement of the male and female frame components of the structure.

Turning again to FIG. 2, an optional flat shelf 21 made of strong material (such as a durable plastic or metal such as iron, aluminum or steel), is firmly affixed to the horizontal support, such as by bolting or welding, to help provide support to the object to be transported at the front portion of the apparatus. Additionally, FIG. 2 shows an optional caster wheel 23 affixed to the L-shaped male member 26 linking the horizontal support and the front portion of the apparatus.

The horizontal support component 6 comprises a female frame component 24 and a L-shaped male frame component 26 slidably contained within it, having a horizontal section and a vertical section. The length of the horizontal support component is adjustable in the same manner described above. Of course, it will be understood that the relative positions of the male and female frame components as described may easily be reversed such that the male frame component is the rear section and the female frame component in the front section of the horizontal support component 6.

The vertical section of the L-shaped male component 26 extends upwards at an angle of approximately 90 degrees to the horizontal section, as shown in FIG. 2. The front component 4 of the apparatus shown comprises a vertically extending pedestal 28 comprising a female frame component. The height of the vertically extending pedestal is adjusted using the same mechanism shown in FIG. 2 and explained above. The front surface of the vertically extending pedestal includes a handle 30 securely affixed thereto, such as by welding or bolting; the handle optionally may be partially covered by a hand grip 32 made from leather or a flexible material such as rubber.

The top of the vertically extending pedestal is securely joined to a front cross member 34 comprising a female frame component having an approximate total width no greater than the total width of the rear component 8 at its narrowest adjustment. An L shaped male lateral support member 36 is slidably inserted into the bore of each end of the front cross member 34. The width of each of the two lateral support members is adjusted by loosening the retaining bolt 27, adjusting the width by sliding the lateral support member relative to the front cross member, and then tightening the retaining nut again to lock the lateral support member in place. The object to be transported is generally placed between the lateral support members and the support members tightened to firmly hold the object in place during transport. The rear surface of each L-shaped lateral support member includes a loop 17, welded to the support member as retaining means, for example, straps, rope, twine and/or bungee-type cord.

Figure 3:
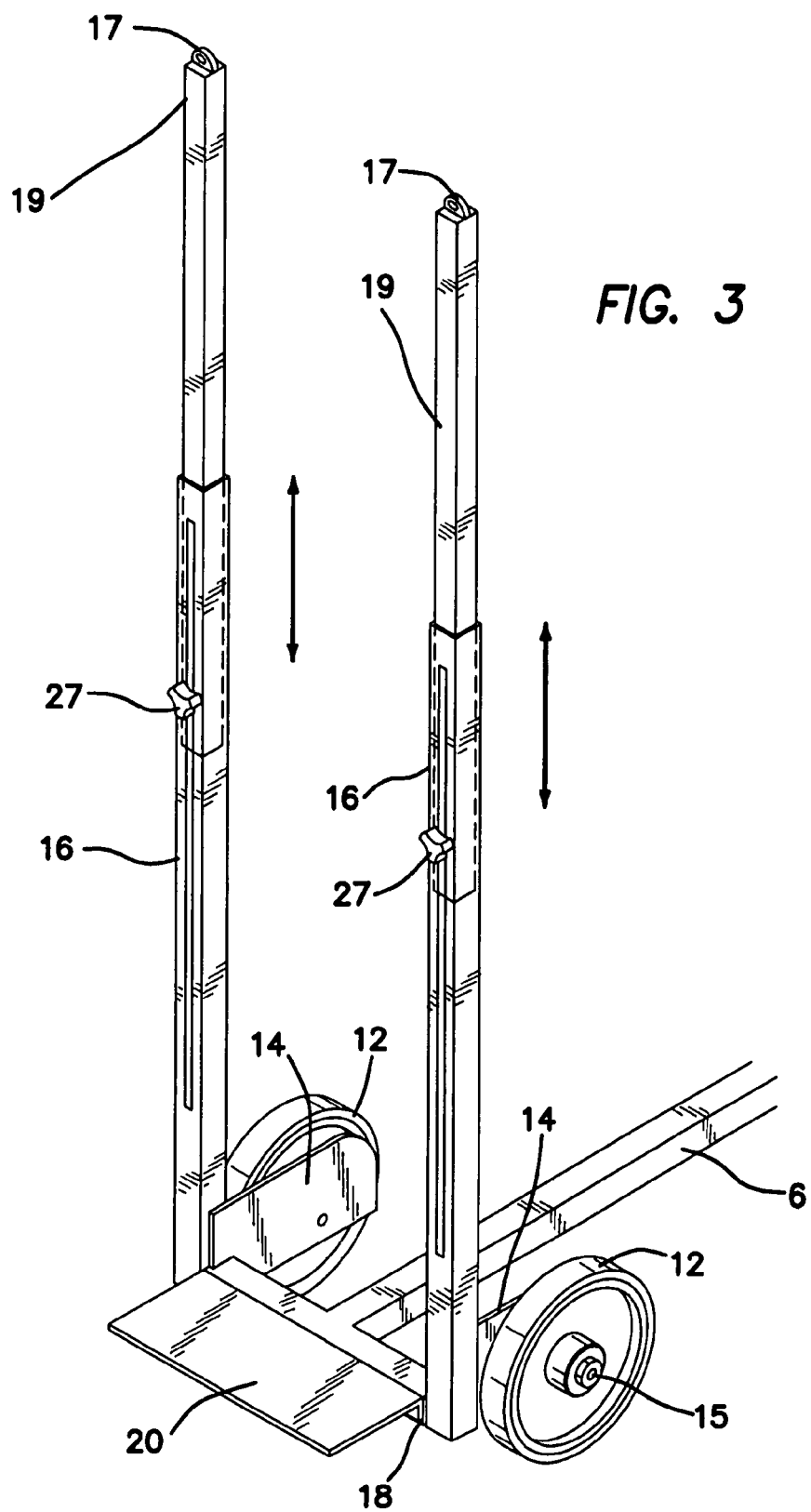
FIG. 3 is a close-up view of the rear component of an embodiment of the apparatus of the invention.

Turning now to FIG. 3, the rear component of the apparatus comprises two vertically extending members 16; these members comprise hollow (external) female frame members 16 within which is slidably located an internal vertically extending member 19 comprising a male frame member similar to that shown in FIG. 2, having a welded loop 17 at its top surface. As also described with reference to FIG. 3, each vertically extending member 19 has an elongated hole or slot through which a bolt is slidably screwed and onto which the bolt handle 27 is tightened to prevent further movement when the height of the vertically extending member is adjusted as desired. The rear component of the apparatus also contains a flat shelf 20 to facilitate loading the object to be transported onto the apparatus, and to assist in supporting the object during transport. Each of the wheels 12 is affixed to a wheel guard 14 by way of an axle 15 welded to the exterior vertical surface of the wheel guard and secured, for example, by means of a pin or nut. Each of the vertically extending members and the flat shelf are securely joined to the rear cross support 18 by welding or bolts. In a similar fashion the horizontal support component 6 is also securely joined to the rear cross support 18.

Figure 4:
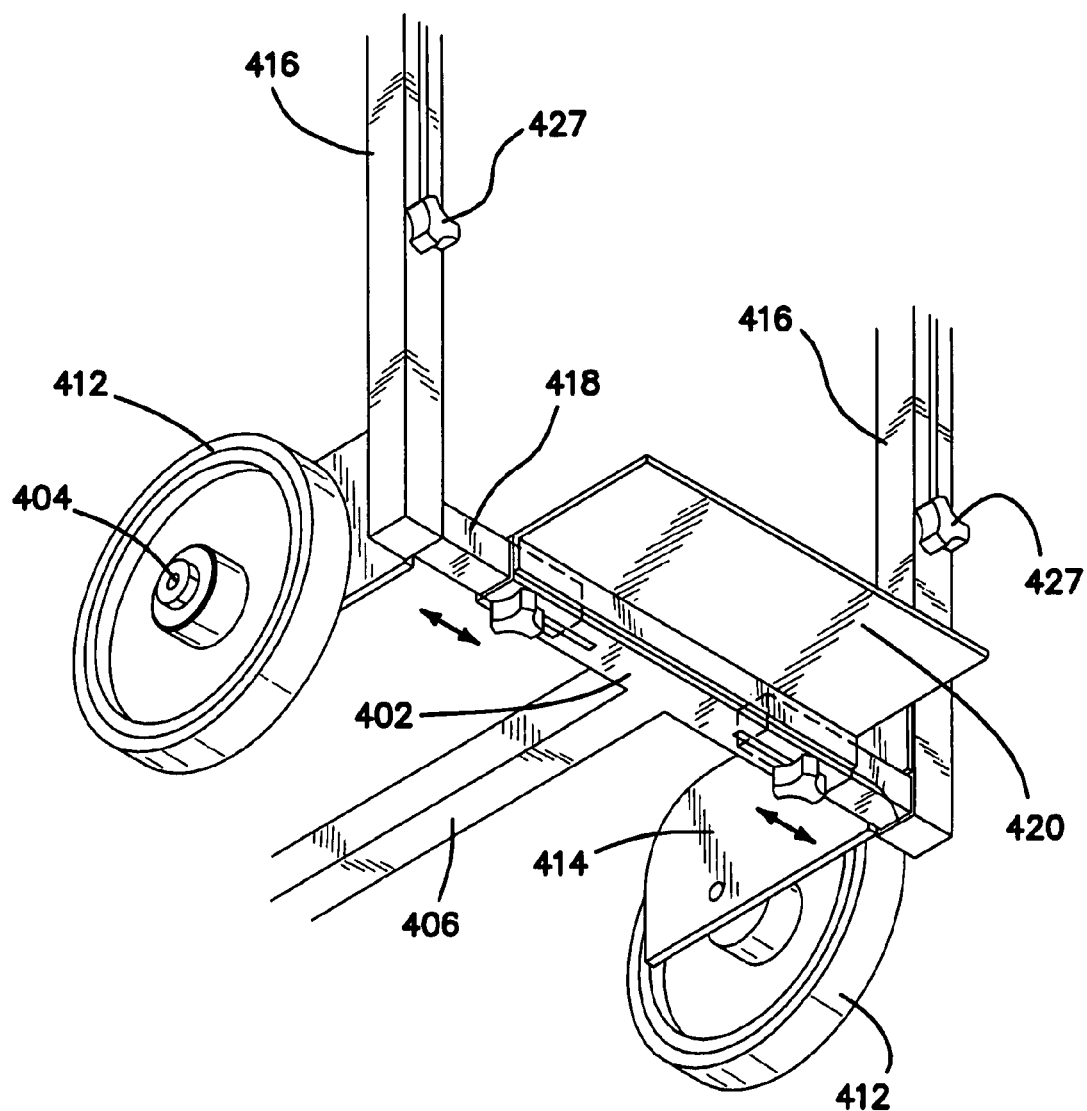
FIG. 4 is a bottom view of the rear component of an embodiment of the invention.

Turning now to FIG. 4, which shows a rear bottom perspective of the rear component of an apparatus of the invention, the vertically extending rigid members 416 are shown, with elongated holes or slots and bolt handles 427 projecting from their rear surface. At their bottom ends, the vertically extending members are welded to a smaller gauge (male) frame segment 418 which is inserted into a shelf housing 402. The shelf housing thus slidably ensheathes the smaller gauge frame segments 418 within its bore. The shelf housing is either formed or folded in such a way as to include the shelf 420 and be made from a single sheet of material, or be welded to the shelf. The shelf housing and male frame segment 418 are thus slidably adjustable as further illustrated in and discussed with regard to FIG. 2, with elongated holes (slots) on the bottom surface of the shelf housing interacting with a nut affixed to the small gauge frame segments 418, and retaining bolts to prevent adjustment when tightened.

The invention has been described with regard to specific embodiments, optional components and steps. It will be understood that each combination of elements that are not mutually incompatible are also intended to be affirmatively described by this specification, and optional elements specifically describe both the presence and lack of these elements or steps. Additionally, the invention is not to be limited by the specific embodiments disclosed herein, but shall be defined solely by the claims which conclude this specification.

Finally, patents and publications cited herein are hereby incorporated by reference in their entirety as part of this specification.

I claim:

1. An apparatus for transporting a bed mattress, having a top surface, a bottom surface, and narrow side, rear and front edges, comprising:
   a) a wheeled rear component comprising
      i) at least a pair of vertically extending rigid members comprising means for adjusting the vertical height of said members and structured to laterally support a bed mattress placed on a narrow side, rear, or front edge therebetween; and ii) a flat shelf extending rearward from the other components of the apparatus and structured to facilitate loading said bed mattress onto the apparatus;

b) a front component comprising a vertically extending pedestal supporting at or near its top at least a pair of lateral supports extending rearward in a substantially horizontal plane to define an open U-shaped-structure to restrain lateral movement of said bed mattress placed therebetween, and c) a horizontal support component joining the rear component and the front component;

wherein the rear component comprises two lateral sides and at least a pair of wheel assemblies, the wheel assemblies being located on opposing lateral sides of the rear component and connected to each other by a shelf housing and frame segments such that the axial distance between wheel assemblies is slidably adjustable, and wherein the shelf housing either comprises or is joined to the flat shelf;

wherein the rear members and/or front supports of the apparatus are structured to prevent said bed mattress placed on its narrow edge therebetween from falling on its top or bottom surface;

wherein the total maximum width of the apparatus is less than about 3 feet; and wherein the lowest height of the vertically extending rigid members is greater than the lowest height of the vertically extending pedestal.

2. The apparatus of claim 1 wherein the width between at least one pair of vertically extending rigid members is adjustable.

3. The apparatus of claim 1 wherein the width between at least one pair of rearward extending lateral supports is adjustable.

4. The apparatus of claim 1 wherein the rear component and the front component are not identical.

5. The apparatus of claim 1 wherein the rear component, horizontal support component and front component comprise a metal frame material.

6. The apparatus of claim 1 wherein the front component comprises at least one wheel.

7. The apparatus of claim 1 wherein the apparatus is structured to permit a single person to transport a mattress.

8. The apparatus of claim 1 wherein the total minimum width of said apparatus is less than about 2.5 feet.

9. The apparatus of claim 1 further comprising fasteners to secure at least one mattress thereto.

10. A composition comprising a) an apparatus comprising a wheeled rear component comprising at least a pair of vertically extending rigid members comprising means for adjusting the vertical height of said members and structured to laterally support a bed mattress, having a top surface, a bottom surface, and narrow side, rear and front edges, placed therebetween and a flat shelf extending rearward from the other components of the apparatus and structured to facilitate loading said at least one bed mattress onto the apparatus, and a front component comprising a vertically extending pedestal supporting at or near its top at least a pair of lateral supports extending rearward in a substantially horizontal plane to define an open U-shaped-structure to restrain lateral movement of said at least one mattress placed therebetween, and a horizontal support component joining the rear component and the front component, wherein the rear component comprises two lateral sides and at least a pair of wheel assemblies, the wheel assemblies being located on opposing lateral sides of the rear component and connected to each other by a shelf housing and frame segments such that the axial distance between wheel assemblies is slidably adjustable, and wherein the shelf housing either comprises or is joined to the flat shelf;

and wherein the total maximum width of the apparatus is less than about 3 feet, and the rear members and/or front supports of the apparatus are structured to prevent a bed mattress placed on its narrow edge therebetween from falling on its top or bottom surface, and b) at least one bed mattress placed on a narrow edge between said at least one pair of vertically extending rigid members and said at least one pair of lateral supports.

11. The composition of claim 10 wherein said mattress is secured to said apparatus using retaining means fastened to a hook or loop located on said apparatus.

12. The composition of claim 10 wherein the apparatus is adjustable in at least one parameter selected from the group consisting of a) the length of the horizontal support component, b) the width between the vertically extending rigid members, and c) the width between the lateral supports.

* * * * *